US010684241B2

(12) United States Patent
Zhang et al.

(10) Patent No.: US 10,684,241 B2
(45) Date of Patent: Jun. 16, 2020

(54) METHOD FOR DETECTING CLOGGING OF SUBSURFACE FLOW CONSTRUCTED WETLAND

(71) Applicant: SHANDONG UNIVERSITY, Jinan, Shandong (CN)

(72) Inventors: Jian Zhang, Jinan (CN); Huaqing Liu, Jinan (CN); Zhen Hu, Jinan (CN); Chenglu Zhang, Jinan (CN); Jinlin Fan, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 78 days.

(21) Appl. No.: 16/061,022

(22) PCT Filed: Nov. 7, 2017

(86) PCT No.: PCT/CN2017/109610
§ 371 (c)(1),
(2) Date: Jun. 11, 2018

(87) PCT Pub. No.: WO2018/107920
PCT Pub. Date: Jun. 21, 2018

(65) Prior Publication Data
US 2019/0346388 A1    Nov. 14, 2019

(30) Foreign Application Priority Data
Dec. 15, 2016  (CN) .......................... 2016 1 1159664

(51) Int. Cl.
*G01N 27/04* (2006.01)
*G01V 3/06* (2006.01)
*C02F 3/32* (2006.01)

(52) U.S. Cl.
CPC ............. *G01N 27/048* (2013.01); *G01V 3/06* (2013.01); *C02F 3/327* (2013.01); *C02F 2209/42* (2013.01)

(58) Field of Classification Search
CPC .............................. G01N 27/048; G01V 3/06
(Continued)

(56) References Cited
U.S. PATENT DOCUMENTS 5,357,202 A * 10/1994 Henderson ............... G01M 3/16
324/357
5,537,045 A * 7/1996 Henderson ............... G01M 3/16
324/522
(Continued)

FOREIGN PATENT DOCUMENTS

CN    102027366 A    4/2011
CN    102565863 A    7/2012
(Continued)

OTHER PUBLICATIONS

Feb. 5, 2018 Written Opinon of the International Searching Authority issued in International Patent Application No. PCT/CN2017/109610.

*Primary Examiner* — Reena Aurora
(74) *Attorney, Agent, or Firm* — Oliff PLC

(57) ABSTRACT

A method for detecting clogging of a subsurface flow constructed wetland, including the steps of firstly emptying water in the subsurface flow constructed wetland, and then measuring the apparent resistivity of the subsurface flow constructed wetland bed after the water is emptied, wherein the water holding capacity of clogging sediments in the clogged region after emptying is strong, the apparent resistivity of this region is further measured to be lower than an unclogged region and the clogged region can thus be positioned and analyzed, the apparent resistivity of the region (Continued)

clogged more seriously is lower and the degree of clogging can thus be quantitatively analyzed.

10 Claims, 2 Drawing Sheets

(58) Field of Classification Search
USPC .......................................................... 324/354
See application file for complete search history.

(56) References Cited

U.S. PATENT DOCUMENTS

| | | |
|---|---|---|
| 6,295,512 B1 | 9/2001 | Bryant |
| 8,217,668 B2 * | 7/2012 | Park .......................... E02D 1/02 |
| | | 324/347 |

FOREIGN PATENT DOCUMENTS

| | | |
|---|---|---|
| CN | 104049279 A | 9/2014 |
| CN | 104360398 A | 2/2015 |
| CN | 105137490 A | 12/2015 |
| CN | 106680326 A | 5/2017 |

* cited by examiner

METHOD FOR DETECTING CLOGGING OF SUBSURFACE FLOW CONSTRUCTED WETLAND

FIELD OF THE INVENTION

The present invention relates to a method for detecting clogging of a subsurface flow constructed wetland, belonging to the technical field of ecological environment protection.

BACKGROUND OF THE INVENTION

When being applied to deep treatment of sewage, the constructed wetland system has the advantages of low construction and operation costs, convenient operation, strong treatment capacity, combined landscape and ecological benefits and the like. The sewage treatment of the constructed wetland is completed under the coaction of microbial degradation, plant absorption, filler adsorption and the like. Compared with a surface flow wetland, due to the water flow pattern and the structural characteristics, the subsurface flow constructed wetland improves the sewage purification ability of microbes, and can reduce the influence of seasonal changes and the breeding of mosquitoes and flies, so application of the method is increasingly wide. However, the filler clogging problem of the subsurface flow constructed wetland has seriously affected the sustainable operation of the system.

Previously, prejudgment methods for constructed wetlands include an observation method, a clogging material sampling determination method, a permeability coefficient determination method, a tracer determination method and the like. These methods all have great defects in the process of popularization and application, wherein the observation method has serious hysteresis; the clogging material sampling determination method has a strong destructive effect on the wetland bat the permeability coefficient method is limited to the determination of a certain point, and is relatively complex in operation; and the tracer method only can be used for overall evaluation on the wetland, and may take a long time and produce secondary pollution.

In recent years, the clogging of a constructed wetland is positioned using resistivity difference in some studies. This method is based on the resistivity difference between a clogged region and an unclogged region. The previous studies directly measured the resistivity during wetland operation. It is generally believed that the dogged region of the constructed wetland has higher resistivity, whereas the unclogged region has the characteristic of lower resistivity. Since clogging materials usually contain more than 90% of water, the significance of the resistivity difference between the dogged and unclogged regions shall be further evaluated.

At present, the studies on the clogging of the constructed wetland are still being perfected. Positioning of the clogged region of the subsurface flow wetland and determination of the degree of clogging are crucial. The mastery of the basic information can provide a powerful technical support for preventing regional clogging deterioration and governing regional clogging.

SUMMARY OF THE INVENTION

In view of the prior art in which the clogging of a constructed wetland is positioned using resistivity difference, it is found in the study of the present invention that there is no significant difference in the resistivity of clogged and unclogged regions when the subsurface flow wetland is in a water saturated state, and the apparent resistivities of matrixes having the sediment mass ratios of 0, 10%, 20% and 30% in the wetland bed as measured in the water saturated state are respectively 26.68 ohm·m, 28.69 ohm·m, 29.67 ohm·m and 28.52 ohm·m, so the accuracy of the method for positioning based on the resistivity difference directly caused by the clogging in specific implementation cannot be guaranteed.

Compared with wetland fillers, clogging sediments contain a large quantity of clay components and well-developed capillary structures, and therefore have the characteristic of strong water holding capability. If the water content is higher, the resists is lower, so after the water in the wetland bed is emptied, the clogged region shows the characteristic of low apparent resistivity, and the apparent resistivity gradually decreases with the increase of sediments. Wetland clogging can be positioned and quantitatively analyzed according to these characteristics. By investigation, the positioning and quantitative determination of clogging of the subsurface flow wetland based on this principle have not been reported.

According to the deficiencies in the prior art and the discovery of the present invention, the present invention adopts the following technical solution:

A method for detecting clogging of a subsurface flow constructed wetland, including the steps of firstly emptying water in the subsurface flow constructed wetland, and then measuring the apparent resistivity of the subsurface flow constructed wetland bed after the water is emptied, wherein the water holding capacity of clogging sediments in the clogged region after emptying is strong, the apparent resistivity of this region is further measured to be lower than an unclogged region and the clogged region can thus be positioned and analyzed, the apparent resistivity of the region clogged more seriously is lower and the degree of clogging can thus be quantitatively analyzed.

The detection method of the present invention is applicable to horizontal subsurface flow constructed wetlands and vertical subsurface flow constructed wetlands.

Preferably, when a subsurface flow constructed wetland drainage system or a water level control system operates normally, the subsurface flow constructed wetland drainage system is adopted for emptying the water, and when the water level of the constructed wetland is displayed as 0, it indicates that the water has been emptied.

Preferably, the types and the particle sizes of fillers in the subsurface flow constructed wetland bed are distributed uniformly. The non-uniform fillers easily result in an error of quantitative analysis on the degree of clogging, the surface of the filler layer is not covered with soil, and the apparent resistivity of the moist soil after emptying is low, so when the layer is covered with soil, the deviation of the measurement result is easily caused.

Preferably, the apparent resistivity of the constructed wetland bed is measured within 24 hours after emptying. It is found by studies that the apparent resistivities shown by the unclogged region and the clogging fillers of various degrees have an increasing trend over time after emptying, the water contents of the clogging fillers of various degrees decrease, and it is impossible to clearly distinguish the region clogged less seriously after 24 hours.

Preferably, the detection method is carried out after the plants on the surface of the subsurface flow wetland are harvested in autumn or winter. Harvesting of plants in autumn or winter is a common control method for wetland clogging, and the detection at this time can facilitate the implementation of the measurement scheme and reduce the impact on the system.

Preferably, a Wenner method is used for measuring the apparent resistivity. The specific method is as follows: electrodes are uniformly arranged on the surface of the filler layer of the subsurface flow constructed wetland along the water flow direction or along the direction perpendicular to the water flow direction, wherein the electrodes are metal bars having the diameters of 1 cm~2 cm, the depths of the electrodes inserted into the filler layer are 10 cm~20 cm, the distances between the electrodes are 40~100 cm, and the distances between the adjacent electrodes are the same and are all L. It is verified by experiments that the measurement results can be guaranteed to be accurate and reliable within this parameter range, and the measurement workload is low.

Further, the adjacent two electrodes M and N are measuring electrodes, the measuring electrodes are connected to a voltmeter, the electrodes A and B on the two sides of the measuring electrodes are power supply electrodes, the power supply electrodes are connected to an alternating current (AC) power supply and an ammeter, an AC voltage of 12V~36V is applied between the electrodes A and B, the measurement results are stable within this range, and the water treatment capacity of the system is less affected within the safety voltage. The resistance $R_x$ between the two electrodes M and N is calculated according to the Ohm's law, and the apparent resistivity of the matrix between the electrodes M and N is $\rho_x = 2\pi L\, R_x$.

Further, any adjacent four electrodes can constitute a measuring electrode and power supply electrode system for measurement along the electrode arrangement direction to obtain the apparent resistivity between the adjacent electrodes in the electrode arrangement direction.

Further, other electrode groups are arranged parallel to the electrode arrangement direction, and the distance between the adjacent two groups of electrodes is 40 cm~100 cm.

The apparent resistivity of the clogged region after the water in the subsurface flow wetland is emptied is lower than that of the unclogged region, and positioning analysis is performed according to this characteristic; the apparent resistivity is lower in the region dogged more seriously, and the quantitative analysis is performed according to this characteristic.

A single group of electrodes is measured according to the above method so as to obtain the clogging information of the profile of the subsurface flow wetland in the arrangement direction of the electrode group. Parallel electrode groups are measured using this method to determine the distribution of the clogged region in the whole wetland bed.

The above technical solution has the following beneficial effects:

The apparent resistivity is measured after the water in the subsurface flow wetland is emptied, sediments in the clogged region have strong water holding capacity after emptying, the apparent resistivity in this region is relatively low, and the apparent resistivity in the region clogged more seriously is lower, so the method can be effectively used for not only positioning analysis on the clogged region but also quantitative analysis on the degree of clogging; by adopting the Winner method to measure the resistance, the result is accurate and reliable, and the calculation and the subsequent data analysis are facilitated; the method has higher distinguishing capability for the clogged region that is clogged less seriously, so the method is high in versatility and practical value; the method can also be used for long-term monitoring of clogging changes of the wetland bed; and the present invention provides a clogging positioning and quantitative detection method without damaging the matrix, which is simple to operate and low in cost and takes less time.

Figure 1:
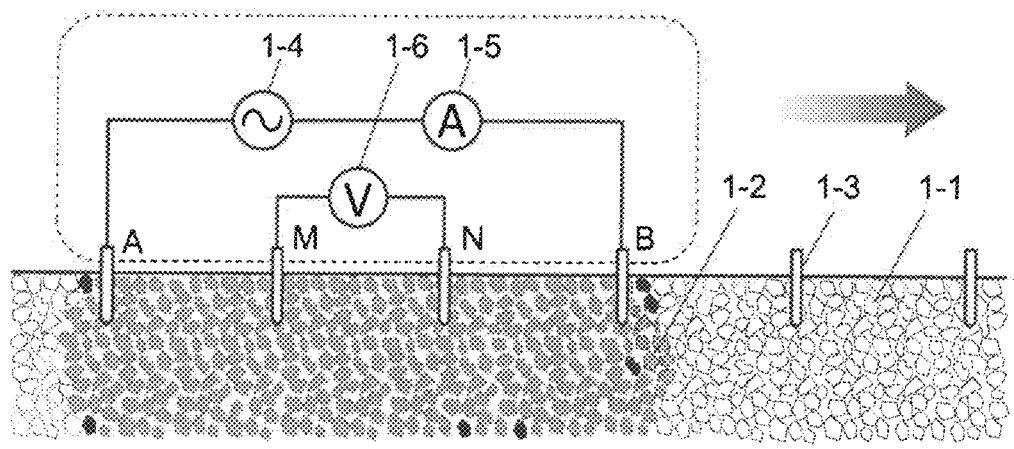
FIG. 1 is a schematic diagram of a method for detecting clogging of a subsurface flow constructed wetland according to the present invention.

In which, 1-1-unclogged region, 1-2-clogged region, 1-3-electrode, 1-4-AC power supply, 1-5-ammeter, 1-6-voltmeter; 2-1-apparent resistivity curve corresponding to unclogging fillers, 2-2-apparent resistivity curve corresponding to a filler having a sediment ratio of 2%, 2-3-apparent resistivity curve corresponding to a filler having a sediment ratio of 5%, 2-4-apparent resistivity curve corresponding to a filler having a sediment ratio of 10%, 2-5-apparent resistivity curve corresponding to a filler having a sediment ratio of 15%, 2-6-apparent resistivity curve corresponding to a filler having a sediment ratio of 20%, 2-7-apparent resistivity curve corresponding to a filler having a sediment ratio of 30%; 3-1-clogged region having a sediment ratio of 15%, 3-2-clogged region having a sediment ratio of 10%, 3-3-unclogged region, 3-4-clogged region having a sediment ratio of 25%, 3-5-arranged electrode, 3-6-apparent resistivity value of the corresponding position.

DETAILED DESCRIPTION OF THE EMBODIMENTS

The present invention will be further illustrated below in conjunction with embodiments.

A method for detecting clogging of a subsurface flow constructed wetland is mainly applied to the detection of clogging of the subsurface flow constructed wetland. The types and the particle sizes of fillers in the subsurface flow constructed wetland bed are distributed uniformly, and the surface of the filler layer is not covered with soil. Electrodes are uniformly arranged on the surface of the filler layer of the subsurface flow constructed wetland along the water flow direction or along the direction perpendicular to the water flow direction, the electrodes are metal bars having the diameters of 1 cm~2 cm, the depths of the electrodes inserted into the filler layer are 10 cm~20 cm, the distances between the electrodes are 40~100 cm, and the distances between the adjacent electrodes are the same and are all L. The adjacent two electrodes M and N are measuring electrodes, the measuring electrodes are connected to a voltmeter, the electrodes A and B on the two sides of the measuring electrodes are power supply electrodes, the power supply electrodes are connected to an AC power supply and an ammeter, an AC voltage of 12V~36V is applied between the electrodes A and B, the resistance $R_x$ between the two electrodes M and N is calculated according to the Ohm's law, and the apparent resistivity of the matrix between the electrodes M and N is $\rho_x = 2\pi L\, R_x$. Any adjacent four electrodes can constitute a measuring electrode and power supply electrode system for measurement along the electrode arrangement direction to obtain the apparent resistivity $\rho_x$ between the adjacent electrodes in the electrode arrangement direction. Other electrode groups are arranged parallel to the electrode arrangement direction, and the distance between the adjacent two groups of electrodes is 40 cm~100 cm. A subsurface flow wetland drainage system or a water level control system operates normally, and the apparent resistivity of the wetland bed is measured within 24 hours after the water in the subsurface flow wetland is emptied. The measurement method is implemented after the plants on the surface of the subsurface flow wetland are harvested in autumn or winter. The apparent resistivity of the clogged region after the water in the subsurface flow wetland is emptied is lower than that of the unclogged region, and the positioning analysis is performed according to this characteristic; the apparent resistivity is lower in the region clogged more seriously, and the quantitative analysis is performed according to this characteristic.

A single group of electrodes is measured according to the above method so as to obtain the clogging information of the profile of the subsurface flow wetland in the arrangement direction of the electrode group. Parallel electrode groups are measured using this method to determine the distribution of the clogged region in the whole wetland bed.

As shown in FIG. 1, positioning analysis is performed according to the characteristic that the apparent resistivity of the unclogged region 1-1 after the water in the subsurface flow wetland is emptied is higher than that of the clogged region 1-2; the apparent resistivity is lower in the region clogged more seriously, and quantitative analysis is performed according to this characteristic. The following are two specific embodiments under this principle.

Embodiment 1

The change law of apparent resistivities of fillers of different clogging degrees over time after the water is emptied.

A subsurface flow constructed wetland model made artificially for different degrees of clogging is adopted for the constructed wetland of this embodiment. As shown in FIG. 1, the apparent resistivity of the fillers with different clogging degrees is measured by adopting a Winner method, the electrodes 1-3 are copper bars having the diameters of 1.5 cm, the lengths of the electrodes 1-3 are 20 cm, the depths of the electrodes 1-3 inserted into the fillers are 15 cm, the distances between the adjacent electrodes 1-3 are all 40 cm, the adjacent two electrodes M and N are measuring electrodes connected to a voltmeter 1-6, the two electrodes A and B on the two sides of the measuring electrodes are power supply electrodes, and the power supply electrodes are connected to an AC power supply 1-4 and an ammeter 1-5.

The apparent resistivity is measured after the water in the wetland bed is emptied. During the measurement, an AC voltage of 24V is applied between the electrodes A and B. At the same time, the values shown by the ammeter 1-5 and the voltmeter 1-6 are read, the resistance $R_x$ between the two electrodes M and N is calculated, and the apparent resistivity of the matrix between the electrodes M and N is $\rho_x = 0.87\pi R_x$.

Figure 2:
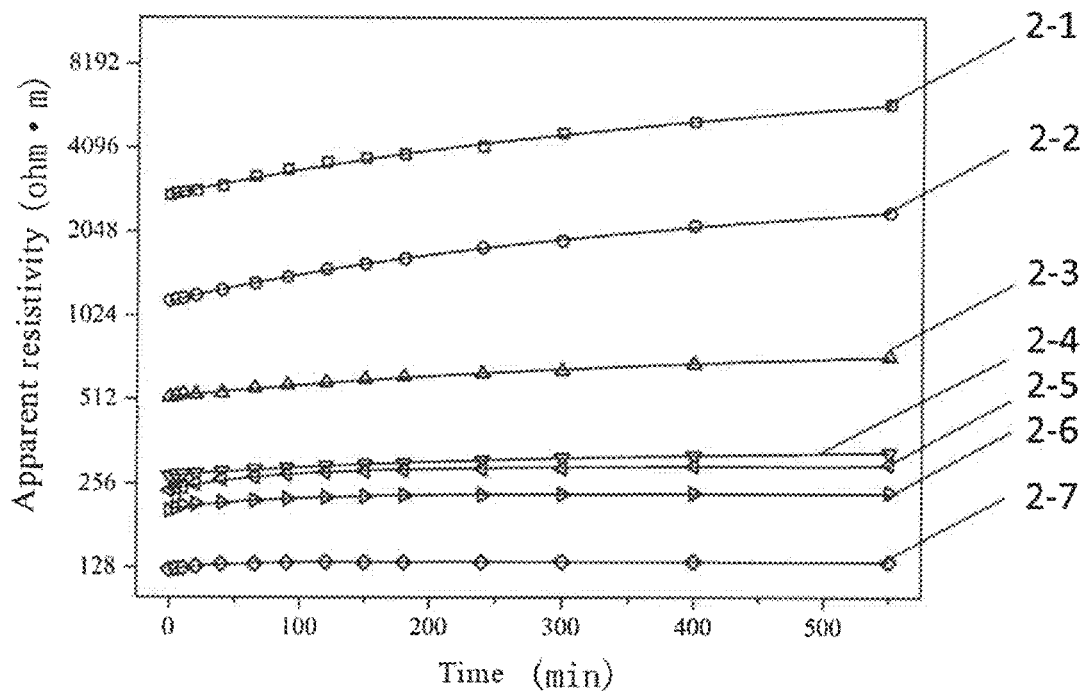
FIG. 2 is a curve diagram showing change of the apparent resistivities of fillers of different clogging degrees over time after emptying according to embodiment 1 of the present invention.

It can be obtained from the change curves of apparent resistivities of fillers at different degrees of clogging over time after the water is emptied in FIG. 2 that the apparent resistivity curves 2-1 to 2-7 corresponding to the specific gravities of clogging sediments from 0% to 30% are arranged in sequence on the y-axis coordinates. If the degree of clogging is higher, the apparent resistivity is lower. The change relationship is related to the types of the fillers, the concentration of ions in the water and the external environment. As the time goes by after emptying, the apparent resistivities of the fillers at various degrees of clogging have a gradually increasing trend, but do not have intersection points. Based on this result, a quantitative model for the apparent resistivity and the clogging degree is established, namely an ARVO model. The details are as follows:

$$\varphi_{Sed.} = a(t) * \exp\left[\frac{-\rho}{b(t)}\right] + c(t)$$

$$a(t) = 9.24 \times 10^{-7} t^2 - 8.73 \times 10^{-4} t + 1.32$$

$$b(t) = -2.24 \times 10^{-4} t^2 + 2.04 \times 10^{-1} t + 1.54 \times 10^2$$

$$c(t) = 1.08 \times 10^{-5} t + 2.91 \times 10^{-2}$$

wherein $\varphi_{Sed.}$ is the pore volume ratio occupied by the clogging, material; $\rho$ is the apparent resistivity ($\Omega \cdot m$); t is the detection time (min) after emptying; a(t), b(t) and c(t) are primary kinetics coefficients t.

Embodiment 2

Apparent resistivity distribution of different regions of a subsurface flow wetland clogged.

Figure 3:
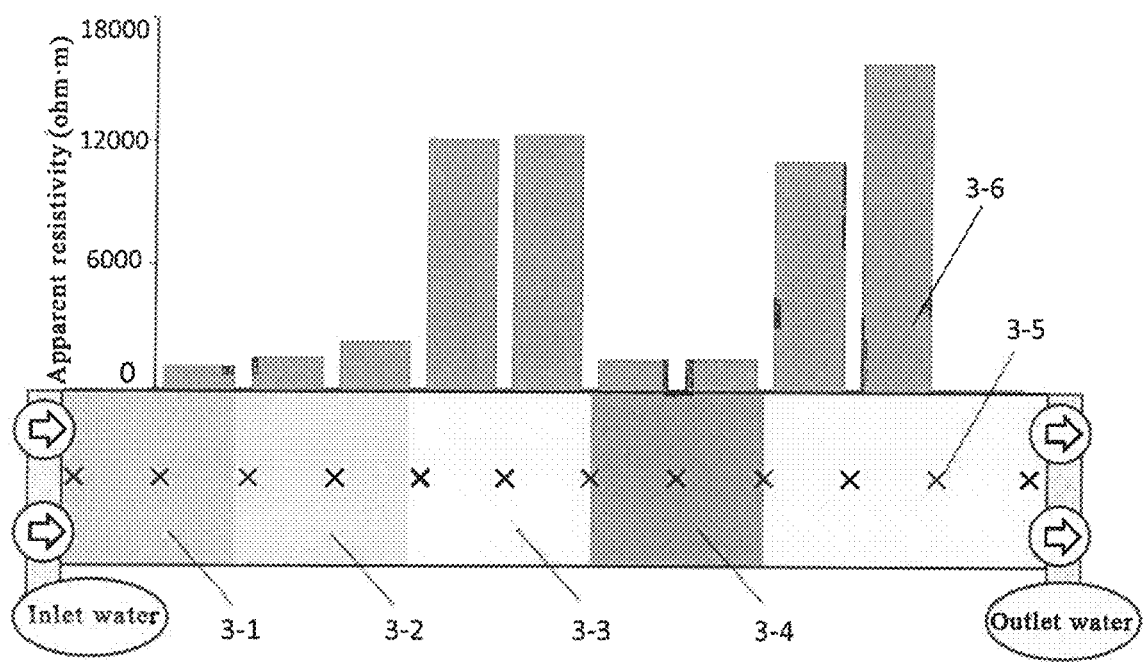
FIG. 3 is a distribution diagram of apparent resistivities in different regions of the subsurface flow wetland clogged according to embodiment 2 of the present invention.

A subsurface flow constructed wetland model made artificially for different degrees of clogging is adopted for the constructed wetland of this embodiment. As shown in FIG. 3, the front end of the subsurface flow constructed wetland bed is a clogged region 3-1 having a sediment ratio of 15%, followed by a clogged region 3-2 having a sediment ratio of 10% and an unclogged region and this phenomenon is clogging caused by sedimentation of particulate matters at a water inlet of the subsurface flow wetland. A clogged region 3-4 having a sediment ratio of 25% is in the middle of the unclogged region, and such clogging is regional clogging caused by non-uniform water flow inside the subsurface flow wetland.

Electrodes 3-5 are iron rods having the diameters of 1.5 cm, the depths of the electrodes 3-5 inserted into fillers are 15 cm, the electrodes 3-5 are arranged along the direction of water flow, and the distances between the electrodes 3-5 are 40 cm. After the water in the wetland bed is emptied, measurement is performed. During the measurement, a voltage of 36V is applied to the power supply electrodes. At the same time, the values of the ammeter and the voltmeter are read and recorded. The apparent resistivity between the measuring electrodes is calculated as $\rho_x = 0.87\pi R_x$, and the apparent resistivity values 3-6 at the corresponding positions are obtained.

It can be seen from the apparent resistivity values 3-6 at the corresponding positions of the subsurface flow wetland bed in FIG. 3 that the apparent resistivities measured at the clogged regions 3-1, 3-2 and 3-4 are relatively low and significantly different from the apparent resistivity of the unclogged region 3-3, so the positions of the clogged regions can be clearly distinguished. In addition, the apparent resistivity result measured at the clogged region 3-1 is lower than that of the clogged region 3-2, indicating that the clogged region 3-1 is clogged more seriously than the clogged region 3-2. Thus, quantitative analysis on the degree of clogging can be achieved: The apparent resistivity measured at the region 3-4 clogged most seriously is greater than that of the region 3-1, which may be caused by the reason that the measuring electrodes are arranged at the junctions of the region 3-4 and the region 3-3 to result in a certain error.

Since the degree of clogging of the matrix in the real large-scale subsurface flow wetland is gradually changing, the difference in the degree of clogging between adjacent regions is not particularly large, so this phenomenon can be avoided in the large-scale subsurface flow constructed wetland.

The degree of clogging of the subsurface flow wetland at each position is calculated based on the apparent resistivity values 3-6 and the ARVO model, and the relative error between the result and the true value is less than 9%, thereby effectively realizing quantitative detection of the clogging degree.

The above embodiments are preferred embodiments of the present invention, but the embodiments of the present inventions are not limited by the foregoing embodiments. Any other changes, modifications, substitutions, combinations or simplifications made without departing from the spirit essence and principle of the present invention shall be equivalent replacements, and shall be included within the protection scope of the present invention.

The invention claimed is:

1. A detection method for detecting clogging of a subsurface flow constructed wetland including a subsurface flow constructed wetland bed, comprising
    firstly emptying water in the subsurface flow constructed wetland, and then
    determining an apparent resistivity of the subsurface flow constructed wetland bed at each of a plurality of regions along a water flow direction or along a direction perpendicular to the water flow direction within the subsurface flow constructed wetland bed after the water is emptied,
    wherein an unclogged region, which is a region among the plurality of regions that is substantially unclogged by clogging sediments that have a water holding capacity, has a highest apparent resistivity among the measured apparent resistivities of the regions,
    wherein a region is determined to be a clogged region clogged to an extent by the clogging sediments where the apparent resistivity of the region is lower than the apparent resistivity of the unclogged region, and
    wherein a lower apparent resistivity of a clogged region relative to the apparent resistivity of other clogged regions is indicative of the clogged region with the lower apparent resistivity having a greater extent of clogging by the clogging sediments.

2. The detection method according to claim 1, wherein types and particle sizes of fillers in the subsurface flow constructed wetland bed are distributed uniformly, and a surface of the filler layer is not covered with soil.

3. The detection method according to claim 1, wherein the apparent resistivity of the plurality of regions of the subsurface flow constructed wetland bed is determined within 24 hours after the emptying.

4. The detection method according to claim 1, wherein the detection method is carried out after plants on the surface of the subsurface flow constructed wetland are harvested in autumn or winter.

5. The detection method according to claim 1, wherein the subsurface flow constructed wetland includes a subsurface flow constructed wetland drainage system or a water level control system that in normal operation is adapted for the emptying of the water, and wherein when a water level of the subsurface flow constructed wetland is displayed as 0, the water is determined to have been emptied.

6. The detection method according to claim 1, wherein the apparent resistivity of each of the plurality of regions is determined using a Wenner method.

7. The detection method according to claim 1, wherein electrodes are uniformly arranged on a surface of a filler layer of the subsurface flow constructed wetland along the water flow direction or along the direction perpendicular to the water flow direction, the electrodes being metal bars having diameters of from about 1 cm to 2 cm, depths of the electrodes inserted into the filler layer being from about 10 cm to 20 cm, distances between each of the electrodes being from about 40 cm to 100 cm, and distances between adjacent electrodes all being the same.

8. The detection method according to claim 7, wherein two adjacent electrodes are designated measuring electrodes for a matrix between the two adjacent electrodes, wherein the measuring electrodes are connected to a voltmeter, wherein two additional electrodes, one outside each of the measuring electrodes, are power supply electrodes, wherein the power supply electrodes are connected to an AC power supply and an ammeter, and wherein for the determining, an AC voltage of from about 12 V to 36 V is applied between the power supply electrodes, a resistance $R_x$ between the two measuring electrodes is calculated according to Ohm's law, and the apparent resistivity of the matrix between the measuring electrodes is determined based on the formula $\rho_x=2\pi L\ R_x$.

9. The detection method according to claim 8, wherein any consecutively adjacent four electrodes can constitute an electrode arrangement of the measuring electrodes and the power supply electrodes for measurement along a direction of the electrode arrangement to determine the apparent resistivity $\rho_x$ between the measuring electrodes in the electrode arrangement direction.

10. The detection method according to claim 9, wherein other electrode groups are arranged parallel to the electrode arrangement direction, and a distance between adjacent two groups of electrodes is from about 40 cm to 100 cm.

* * * * *